(12) United States Patent
Wu et al.

(10) Patent No.: US 10,487,228 B2
(45) Date of Patent: Nov. 26, 2019

(54) STRETCHABLE INK COMPOSITION

(71) Applicant: Xerox Corporation, Norwalk, CT (US)

(72) Inventors: Yiliang Wu, Oakville (CA); Cameron Derry, London (CA); Ke Zhou, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/381,990

(22) Filed: Apr. 11, 2019

(65) Prior Publication Data
US 2019/0241755 A1 Aug. 8, 2019

Related U.S. Application Data

(62) Division of application No. 13/957,213, filed on Aug. 1, 2013, now Pat. No. 10,308,826.

(60) Provisional application No. 61/849,815, filed on Feb. 6, 2013.

(51) Int. Cl.
| | |
|---|---|
| C09D 11/30 | (2014.01) |
| C08F 220/18 | (2006.01) |
| C08F 2/50 | (2006.01) |
| C08F 8/30 | (2006.01) |
| C08F 220/16 | (2006.01) |
| C08F 283/04 | (2006.01) |
| C08F 220/10 | (2006.01) |
| C08F 220/26 | (2006.01) |
| C08F 220/12 | (2006.01) |
| C08F 220/20 | (2006.01) |
| C08F 265/06 | (2006.01) |
| C08J 3/24 | (2006.01) |
| C08J 3/20 | (2006.01) |
| C08K 5/00 | (2006.01) |
| C08K 5/07 | (2006.01) |
| C08K 5/5397 | (2006.01) |
| C09D 11/104 | (2014.01) |
| C09D 175/16 | (2006.01) |
| C09D 11/10 | (2014.01) |
| C09D 11/02 | (2014.01) |
| C09D 167/07 | (2006.01) |
| C09D 11/102 | (2014.01) |
| B41J 2/01 | (2006.01) |
| C09D 11/00 | (2014.01) |
| C09D 11/107 | (2014.01) |
| C09D 11/101 | (2014.01) |
| C08K 5/3417 | (2006.01) |
| C08K 3/013 | (2018.01) |

(52) U.S. Cl.
CPC ............... C09D 11/30 (2013.01); B41J 2/01 (2013.01); C08F 2/50 (2013.01); C08F 8/30 (2013.01); C08F 220/10 (2013.01); C08F 220/12 (2013.01); C08F 220/16 (2013.01); C08F 220/18 (2013.01); C08F 220/20 (2013.01); C08F 220/26 (2013.01); C08F 265/06 (2013.01); C08F 283/045 (2013.01); C08J 3/20 (2013.01); C08J 3/24 (2013.01); C08K 3/013 (2018.01); C08K 5/00 (2013.01); C08K 5/0025 (2013.01); C08K 5/07 (2013.01); C08K 5/3417 (2013.01); C08K 5/5397 (2013.01); C09D 11/00 (2013.01); C09D 11/02 (2013.01); C09D 11/10 (2013.01); C09D 11/101 (2013.01); C09D 11/102 (2013.01); C09D 11/104 (2013.01); C09D 11/107 (2013.01); C09D 167/07 (2013.01); C09D 175/16 (2013.01); C08J 2333/08 (2013.01); C08J 2333/10 (2013.01); C08J 2333/12 (2013.01); C08J 2367/07 (2013.01); C08J 2375/16 (2013.01); C08L 2312/00 (2013.01); Y10T 428/2481 (2015.01); Y10T 428/24802 (2015.01); Y10T 428/24901 (2015.01); Y10T 428/24934 (2015.01)

(58) Field of Classification Search
CPC .......... C09D 11/30; C09D 11/00; B41M 5/50; B41J 2/01
See application file for complete search history.

(56) References Cited

U.S. PATENT DOCUMENTS

| | | | |
|---|---|---|---|
| 2002/0089172 A1* | 7/2002 | Patton | G09F 3/00 283/71 |
| 2016/0032118 A1* | 2/2016 | Morris | C09D 11/10 428/207 |

FOREIGN PATENT DOCUMENTS

JP 2003313465 A * 11/2003 ............. C09D 11/00

* cited by examiner

Primary Examiner — Betelhem Shewareged
(74) Attorney, Agent, or Firm — Marylou J. Lavoie, Esq. LLC

(57) ABSTRACT

A stretchable ink composition comprising a polyester; a polyurethane elastomer; water; a co-solvent; an optional surfactant; and an optional colorant.

15 Claims, No Drawings

STRETCHABLE INK COMPOSITION

RELATED APPLICATIONS

This application is a divisional of U.S. application Ser. No. 13/957,213, filed Aug. 1, 2013, U. S. Publication Number US-2014-0220322-A1, the disclosure of which is totally incorporated by reference herein.

This application claims the benefit of U.S. Provisional Application Ser. No. 61/849,815 filed Feb. 6, 2013, which is hereby incorporated by reference herein in its entirety.

Commonly assigned U.S. patent application Ser. No. 13/957,185, entitled "A Solventless Radiation Curable Stretchable Ink Composition"), with the named inventors Cameron Derry, Yiliang Wu, Naveen Chopra, and Peter G. Odell, filed concurrently herewith, is hereby incorporated by reference herein in its entirety.

Commonly assigned U.S. patent application Ser. No. 13/957,374, entitled "Stretchable Ink Composition"), with the named inventors Yiliang Wu and Cameron Derry, filed concurrently herewith, is hereby incorporated by reference herein in its entirety.

BACKGROUND

The present embodiments relate to ink compositions suitable for printing marks or images on deformable substrates. In particular, disclosed herein is a stretchable water-based ink composition. These ink compositions can be used for ink jet printing.

Printing marks or images on deformable substrates is desirable for many applications, such as flexible medical devices, including surgical tools and implantable medical devices, robot skins, textiles (e.g., for stretchable swimming suits), rubber products such as tires, tubes, and cables, and the like. Consumable products based on rubbers and some textiles are also stretchable. Because of the highly deformable characteristic of the substrate, a stretchable ink is desired for printing on such substrates to achieve excellent image quality, image robustness, and image longevity.

Previous work by the inventors includes a stretchable ink composition which comprises water, a colorant, a surfactant, and a fluoroelastomer, as disclosed in U.S. patent application Ser. No. 13/182,579 to Wu et al., filed on Jul. 14, 2011, which is hereby incorporated by reference herein in its entirety.

U.S. patent application Ser. No. 13/495,915, which is hereby incorporated by reference herein in its entirety, of Wu et al., describes in the Abstract thereof an ink composition suitable for ink jet printing, including printing on deformable substrates. In embodiments, the stretchable ink composition is based on an aqueous ink formulation comprising an emulsion of a polyurethane elastomer in combination with colorant dispersions, and surfactants.

Water-based latex inks have been proposed. Certain water-based latex inks comprise water, water-miscible co-solvent, latex particles, and colorant such as pigment particles. For example, certain wide-format ink jet printers employ latex inks. The inks are cured inside the printer using radiant heat and forced air to coalesce latex particles into a film that encapsulates the pigments and bonds to print media. While robust images can be formed on normal paper or coated paper with such inks, there remains a need for a latex ink that can be successfully used on deformable materials which are used for many applications such as flexible medical devices, robot skins, textiles (e.g. for stretchable swimming suits), rubber products including tires, tubes, and cables. Due to the highly deformable characteristic of the substrate materials, a stretchable ink, preferably with pigment colorants, is desirable that can print on deformable substrates while achieving excellent image robustness and image longevity. Current latex inks are not stretchable. Further, current latex inks are generally based on acrylate resin which can be cost prohibitive.

While known compositions and processes are suitable for their intended purposes, a need remains for improved ink compositions with certain characteristics. Specifically, a need remains for ink compositions suitable for printing on deformable or stretchable substrates. Additionally, a need remains for stretchable inks that form robust images which can be stretched and relaxed for a high number of cycles. There is also a need for stretchable inks that have good color stability. There is also a need for stretchable inks that exhibit good resistance to environmental factors such as light, chemicals, water, and oxidizing gases, thus generating hydrophobic and water-resistant images. There further remains a need for stretchable inks that are suitable for both indoor and outdoor applications. There further remains a need for such inks can be applied digitally.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a stretchable ink composition comprising a polyester; a polyurethane elastomer; water; a co-solvent; an optional surfactant; and an optional colorant.

Also described is a patterned article comprising a deformable substrate; an image printed on the deformable substrate, the image being formed from a stretchable ink comprising a polyester; a polyurethane elastomer; water; a co-solvent; an optional surfactant; and an optional colorant.

DETAILED DESCRIPTION

A stretchable ink composition is provided comprising a polyester; a polyurethane elastomer; water; a co-solvent; an optional surfactant; and an optional colorant.

In embodiments, the stretchable ink composition comprises an emulsion of a polyester resin, an emulsion of a polyurethane elastomer, a pigment dispersion, and surfactants. In other embodiments, the stretchable ink composition comprises a latex comprising the polyester resin, a latex comprising the polyurethane elastomer, a pigment dispersion, and surfactants. The stretchable ink composition can be ink jet printed onto various deformable substrates, such as for example, a stretchable latex rubber substrate, to provide an image having image longevity. The printed images exhibit superior performance on the deformable substrates, which are generally difficult to print upon.

In embodiments, the stretchable ink composition can be used to prepare a patterned article. In embodiments, a patterned article is provided comprising a deformable substrate; an image printed on the deformable substrate, the image being formed from a stretchable ink comprising a polyester; a polyurethane elastomer; water; a co-solvent; an optional surfactant; and an optional colorant.

In embodiments, the stretchable ink herein has a low viscosity which is compatible with inkjet printing methods. The printed stretchable ink provided herein can form robust images on a variety of substrates including normal paper, coated photo paper, and rubber substrates. Moreover, in embodiments, images printed with the stretchable ink herein can be stretched hundreds of cycles without showing any crack and de-lamination, when printed on a deformable substrate, in embodiments, a rubber substrate.

The stretchable ink compositions herein comprise polyester resin, which is a low cost material for xerographic applications, in combination with polyurethane elastomer. In certain embodiments, the stretchable ink is a radiation curable ink, in embodiments, an ultra-violet radiation curable ink.

Polyester.

In embodiments, the stretchable ink composition herein is based on an aqueous formulation comprising an emulsion of polyester in combination with an emulsion of elastomer materials.

Any suitable or desired polyester can be used for the stretchable ink compositions herein. In embodiments, the polyester can be a material described in U.S. Pat. Nos. 6,593,049 and 6,756,176, which are each hereby incorporated by reference herein in their entireties. Suitable resins can also include a mixture of an amorphous polyester resin and a crystalline polyester resin as described in U.S. Pat. No. 6,830,860, which is hereby incorporated by reference herein in its entirety.

In embodiments, the resin can be a polyester resin formed by reacting a diol with a diacid in the presence of an optional catalyst. For forming a crystalline polyester, suitable organic diols include aliphatic diols having from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol, and the like, including their structural isomers.

The aliphatic diol can be selected in any suitable or desired amount, in embodiments, from about 40 to about 60 mole percent, or from about 42 to about 55 mole percent, or from about 45 to about 53 mole percent, and, in embodiments, a second diol can be selected in any suitable or desired amount, in embodiments, from about 0 to about 10 mole percent, or from about 1 to about 4 mole percent of the resin.

Examples of organic diacids or diesters including vinyl diacids or vinyl diesters that can be selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis-1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid, mesaconic acid, a diester or anhydride thereof, and mixtures and combinations thereof.

The organic diacid can be selected in any suitable or desired amount, in embodiments, from about 40 to about 60 mole percent, or from about 42 to about 52 mole percent, or from about 45 to about 50 mole percent, and in embodiments, a second diacid can be selected in any suitable or desired amount, such as from about 0 to about 10 mole percent of the resin.

Polyester based crystalline resins include poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene-dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate).

Examples of diacid or diesters selected for the preparation of amorphous polyesters include dicarboxylic acids or diesters such as terephthalic acid, phthalic acid, isophthalic acid, fumaric acid, trimellitic acid, dimethylfumarate, dimethylitaconate, cis-1,4-diacetoxy-2-butene, diethyl fumarate, diethyl maleate, maleic acid, succinic acid, itaconic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and mixtures and combinations thereof. The organic diacid or diester may be present in any suitable or desired amount, for example, in an amount from about 40 to about 60 mole percent of the resin, or from about 42 to about 55 mole percent of the resin, or from about 45 to about 53 mole percent of the resin.

Examples of diols which can be utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, and mixtures and combinations thereof. The amount of organic diol selected can vary, and may be selected in any suitable or desire amount, for example, in an amount of from about 40 to about 60 mole percent of the resin, or from about 42 to about 55 mole percent of the resin, or from about 45 to about 53 mole percent of the resin.

Amorphous polyester resins include alkali sulfonated-polyester resins, branched alkali sulfonated-polyester resins, alkali sulfonated-polyimide resins, and branched alkali sulfonated-polyimide resins. Alkali sulfonated polyester resins include the metal or alkali salts of copoly(ethylene-terephthalate)-copoly(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfoisophthalate), copoly(propylene-butylene-terephthalate)-copoly(propylene-butylene-5-sulfo-isophthalate), and copoly(propoxylated bisphenol-A-fumarate)-copoly(propoxylated bisphenol A-5-sulfo-isophthalate).

In embodiments, polycondensation catalysts may be used in forming the polyesters. Polycondensation catalysts which may be utilized for either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, and mixtures and combinations thereof. Such catalysts may be utilized in any suitable or desired amount, such as from about 0.01 mole percent to about 5 mole percent based on the starting diacid or diester used to generate the polyester resin.

In embodiments, as noted above, an unsaturated, amorphous polyester resin may be utilized as the polyester herein. Examples of such resins include those disclosed in U.S. Pat. No. 6,063,827, the disclosure of which is hereby incorporated by reference herein in its entirety. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

In embodiments, a suitable polyester resin may be a an amorphous polyester such as a poly(propoxylated bisphenol A co-fumarate) resin having the formula

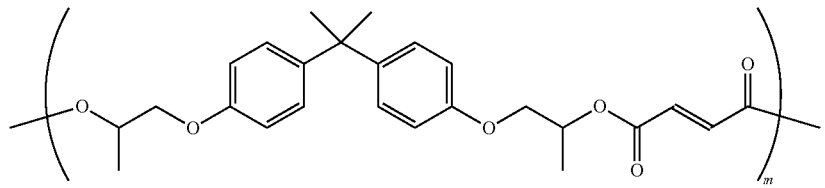

wherein m is an integer, in embodiments of from about 5 to about 1000, or from about 10 to about 500, or from about 15 to about 200.

An example of a linear propoxylated bisphenol A fumarate resin which may be utilized as a latex resin is the resin available under the trade name SPARII from Resana S/A Industrias Quimicas, Sao Paulo, Brazil. Other propoxylated bisphenol A fumarate resins that may be utilized and are commercially available include GTUF and FPESL-2 from Kao Corporation, Japan, and EM181635 from Reichhold, Research Triangle Park, N.C.

Suitable crystalline resins which may be utilized, optionally in combination with an amorphous resin as described above, include those disclosed in U.S. Patent Publication 2006/0222991, the disclosure of which is hereby incorporated by reference herein in its entirety. In embodiments, a suitable crystalline resin may include a resin formed of ethylene glycol and a mixture of dodecanedioic acid and fumaric acid co-monomers of the formula

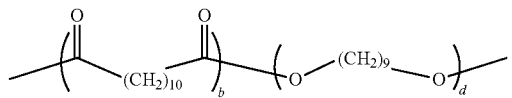

wherein b is an integer, in embodiments, of from about 5 to about 2,000 and d is an integer, in embodiments, of from about 5 to about 2,000.

For example, in embodiments, a poly(propoxylated bisphenol A co-fumarate) resin as described above may be combined with a crystalline resin to form a latex emulsion.

In embodiments, the resin may possess acid groups which, in embodiments, may be present at the terminal of the resin. Acid groups which may be present include carboxylic acid groups, and the like. The number of carboxylic acid groups may be controlled by adjusting the materials utilized to form the resin and the reaction conditions.

In embodiments, the polyester resin may have an acid number from about 2 mg KOH/g of resin to about 200 mg KOH/g of resin, or from about 5 mg KOH/g of resin to about 50 mg KOH/g of resin. The acid containing resin may be dissolved in tetrahydrofuran solution. The acid number may be detected by titration with KOH/methanol solution containing phenolphthalein as the indicator. The acid number may then be calculated based on the equivalent amount of KOH/methanol required to neutralize all of the acid groups on the resin identified as the end point of the titration.

In certain embodiments, the polyester has a glass transition temperature (Tg) of from about 30 to about 180° C., or from about 50 to about 150° C., or from about 60 to about 120° C. In a specific embodiment, the polyester has a glass transition temperature of higher than about 30° C.

In certain embodiments, the polyester is provided in the form of an emulsion comprising the polyester. In other embodiments, the polyester is provided in the form of a latex comprising the polyester. In embodiments, the polyurethane is a polyurethane elastomer emulsion or polyurethane latex; and the polyester is a polyester emulsion or polyester latex.

In embodiments, the polyester emulsion or latex has a volume average particle size of from about 20 nanometers (nm) to about 1000 nm, or from about 20 to about 800 nm, or from about 50 to about 800 nm, or from about 50 to about 500 nm, or from about 50 to about 300 nm, or from about 100 to about 300 nanometers.

The characteristics of the polyester latex or emulsion, as well as the polyurethane latex or emulsion described herein below, may be determined by any suitable technique and apparatus. Volume average particle diameter may be measured by means of a measuring instrument such as a Beckman Coulter Multisizer 3, operated in accordance with the manufacturer's instructions.

In a specific embodiment, the polyester is a compound of the formula

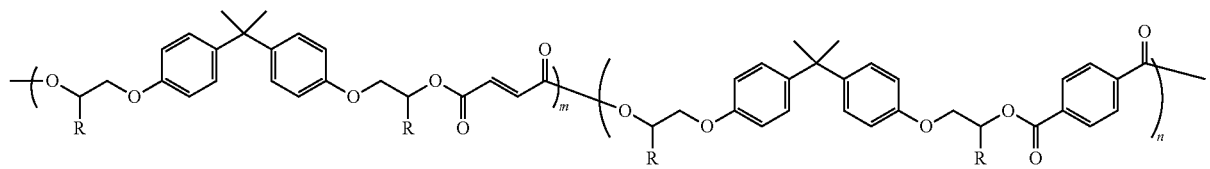

wherein R is hydrogen or methyl, m is an integer of from about 2 to about 10, and n is an integer of from about 2 to about 10.

In embodiments, the polyester may be present in any desired or effective amount, such from about 0.1 to about 25 percent, or from about 1 to about 20 percent, or from about 2 to about 14 percent, by weight, based on the total weight of the stretchable ink composition.

Polyurethane.

In embodiments, the stretchable ink composition herein is based on an aqueous formulation comprising an emulsion of polyester in combination with an emulsion of elastomer materials. An elastomer is defined by the Collins English Dictionary as any material, such as natural or synthetic rubber, that is able to resume its original shape when a deforming force is removed.

A polyurethane elastomer, for the purposes of the present disclosure, is a polyurethane that behaves according to the above definition of an elastomer. Polyurethane is known to exhibit excellent chemical and water resistance. Therefore, the present embodiments provide a stretchable ink that is especially suitable for applications that are used outdoors and/or involve exposure to moisture or water.

Polyurethane is a polymer comprising urethane groups of the formula

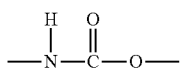

In embodiments, the polyurethane elastomer is the product of a polyol of the formula

HO-M-OH wherein M is selected from the group consisting of polyester, polyether, polycaprolactones, polybutadiene, and mixtures thereof;

and an isocyanate of the formula

NCO—$R_1$—OCN wherein $R_1$ is selected from the group consisting of an aromatic group, an aliphatic group, and mixtures thereof, and wherein $R_1$ has from about 4 to about 24 carbon atoms; with diol or diamine as the chain extender. An exemplary scheme for formation of polyurethane elastomer is illustrated below:

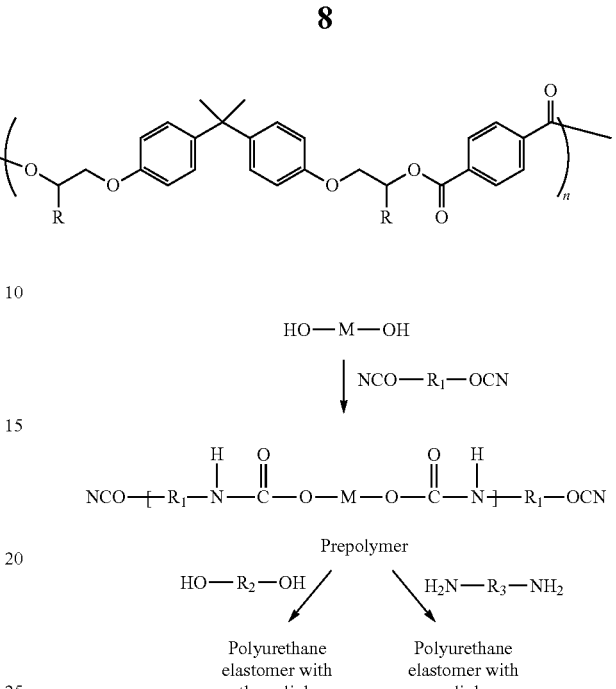

In embodiments, the M moiety in the polyol is selected from the group consisting of polyester, polyether, polycaprolactones, polybutadiene, and combinations thereof. In embodiments, the polyol has a molecular weight from about 300 to about 5000, or from about 500 to about 4000, or from about 600 to about 3000.

In embodiments, the polyurethane elastomer is a polyurethane elastomer with a urethane linkage of the formula

HO—$R_2$—OH wherein $R_2$ is selected from the group consisting of an aromatic group, an aliphatic group, and mixtures thereof, and wherein $R_2$ has from about 4 to about 24 carbon atoms.

In embodiments, the polyurethane elastomer is a polyurethane elastomer with a urea linkage of the formula $H_2N$—$R_3$—$NH_2$ wherein $R_3$ is selected from the group consisting of an aromatic group, an aliphatic group, and mixtures thereof, and wherein $R_2$ has from about 4 to about 24 carbon atoms.

In particular embodiments, the polyurethane is an aliphatic polyurethane. In further embodiments, the polyurethane is a single component polyester based polyurethane elastomer. Such materials are commercially available from Dow Chemical as Monothane™. In some embodiments, the polyurethane elastomer can be cured at room temperature. Polyurethane is a low cost material and thus use of that elastomer in the present embodiments help reduce manufacturing costs.

In certain embodiments, the polyurethane has a glass transition temperature (Tg) of from about −70 to about 10° C., or from about −50 to about 0° C., or from about −50 to about 5° C. In a specific embodiment, the polyurethane has a glass transition temperature of less than about 0° C.

In certain embodiments, the polyurethane is provided in the form of an emulsion comprising a polyurethane.

In other embodiments, the polyurethane is provided in the form of a latex comprising the polyurethane.

In specific embodiments, the emulsion comprises nano-sized particles of materials. In embodiments, the stretchable ink composition comprises an aqueous formulation comprising an emulsion or latex of polyurethane elastomer materials wherein the elastomeric materials have an average particle size of from about 20 nanometers (nm) to about 1000 nm, or from about 20 to about 800 nm, or from about 50 to about 800 nm, or from about 50 to about 500 nm, or from about 50 to about 300 nm, or from about 100 to about 300 nanometers. For example, in such examples, the emulsion of elastomer materials comprises nano-sized particles having a size of from about 30 to about 1000 nm or from about 50 to about 600 nm. In such embodiments, the colorant can be dispersed in an emulsion comprising particles having a size of from about 30 to about 1000 nm or from about 50 to about 600 nm or from about 50 to about 300 nm.

In embodiments, the polyurethane elastomer may be present in any desired or effective amount, such from about 0.1 to about 25 percent, or from about 1 to about 20 percent, or from about 2 to about 14 percent, by weight, based on the total weight of the stretchable ink composition.

In embodiments, the polyurethane elastomer has a tensile strength of at least about 0.5 MPa, at least about 1.0 MPa, at least about 3.0 MPa, at least about 5.0 mPa, or no more than about 25 MPa, no more than about 20 MPa, or no more than about 18 MPa, as measured by ASTM D412C, although the tensile strength can be outside of these ranges. In certain embodiments, the polyurethane elastomer has a tensile strength of at least 1.0 MPa to no more than 18 MPa.

In embodiments, the polyurethane elastomer has an elongation at break of at least about 150%, at least about 200%, at least about 400%, or no more than about 1100%, no more than about 1000%, or no more than about 800%, as measured by ASTM D412C, although the elongation at break can be outside of these ranges.

In embodiments, the polyurethane elastomer has a hardness (Shore A) value of at least about 20, at least about 30, at least about 40, or no more than about 90, no more than about 85, or no more than about 80, as measured by ASTM 2240, although the hardness can be outside of these ranges.

The combination of the polyester having a high Tg and polyurethane with a low Tg enables a printed image with excellent stretchability and very good document offset.

Colorant.

The stretchable ink composition herein may also contain a colorant. Any suitable or desired colorant can be used in embodiments herein, including pigments, dyes, and mixtures and combinations thereof.

The colorant may be provided in the form of a colorant dispersion. In embodiments, the colorant dispersion has an average particle size of from about 20 to about 500 nanometers (nm), or from about 20 to about 400 nm, or from about 30 to about 300 nm. In embodiments, the colorant is selected from the group consisting of dyes, pigments, and combinations thereof, and optionally, the colorant is a dispersion comprising a colorant, an optional surfactant, and an optional dispersant.

In embodiments, with suitable surfactants, the polyester emulsion, polyurethane emulsion, or combination thereof, can be mixed together with a colorant dispersion without forming any agglomerates. As a result, the colorant is homogenously dispersed throughout the polyurethane matrix. The viscosity of the mixture can subsequently be adjusted for inkjet printing. After being printed on a deformable substrate and dried, the ink composition forms robust images that could be stretched up to 150% for thousands of cycles. In further embodiments, the images can be stretched up to 300% for hundreds of cycles or up to 500% for hundreds of cycles.

As noted, any suitable or desired colorant can be selected in embodiments herein. The colorant can be a dye, a pigment, or a mixture thereof. Examples of suitable dyes include anionic dyes, cationic dyes, nonionic dyes, zwitterionic dyes, and the like. Specific examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), Reactive Dyes, such as Reactive Red Dyes (No. 4, 31, 56, 180, and the like), Reactive Black dyes (No. 31 and the like), Reactive Yellow dyes (No. 37 and the like); anthraquinone dyes, monoazo dyes, disazo dyes, phthalocyanine derivatives, including various phthalocyanine sulfonate salts, aza(18)annulenes, formazan copper complexes, triphenodioxazines, and the like; and the like, as well as mixtures thereof.

Examples of suitable pigments include black pigments, white pigments, cyan pigments, magenta pigments, yellow pigments, or the like. Further, pigments can be organic or inorganic particles. Suitable inorganic pigments include carbon black. However, other inorganic pigments may be suitable such as titanium oxide, cobalt blue (CoO—$Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitro pigments, nitroso pigments, anthanthrone pigments such as PR168, and the like. Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation. Examples of black pigments that may be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Colombian Chemicals Company, Evonik, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Colombian pigments such as RAVEN 5000, and RAVEN 3500; Evonik pigments such as Color Black FW 200, FW 2, FW 2V, FW 1, FW18, FW S160, FW S170, Special Black 6, Special Black 5, Special Black 4A, Special Black 4, PRINTEX U, PRINTEX 140U, PRINTEX V, and PRINTEX 140V. The above list of pigments includes unmodified pigment particulates, small molecule attached pigment particulates, and polymer-dispersed pigment particulates. Other pigments can also be selected, as well as mixtures thereof. The pigment particle size is desired to be as small as possible to enable a stable colloidal suspension of the particles in the liquid vehicle and to prevent clogging of the ink channels when the ink is used in a thermal ink jet printer or a piezoelectric ink jet printer.

The colorant can be present in the stretchable ink composition in any desired or effective amount, in embodiments, the colorant can be present in an amount of from about 0.05 to about 15 percent, or from about 0.1 to about 10 percent, or from about 1 to about 5 percent by weight, based on the total weight of the stretchable ink composition.

Vehicle.

The stretchable ink composition herein comprises a liquid ink vehicle, in embodiments, an aqueous ink vehicle. Any suitable or desired material can be selected for the ink vehicle. The liquid vehicle can consist solely of water, or it can comprise a mixture of water and a water soluble or water miscible organic component, referred to as a co-solvent, humectant, or the like (hereinafter co-solvent) such as alcohols and alcohol derivatives, including aliphatic alcohols, aromatic alcohols, dials, glycol ethers, polyglycol ethers, long chain alcohols, primary aliphatic alcohols, secondary aliphatic alcohols, 1,2-alcohols, 1,3-alcohols, 1,5-alcohols, ethylene glycol alkyl ethers, propylene glycol alkyl ethers, methoxylated glycerol, ethoxylated glycerol, higher homologues of polyethylene glycol alkyl ethers, and the like, with specific examples including ethylene glycol, propylene glycol, diethylene glycols, glycerine, dipropylene glycols, polyethylene glycols, polypropylene glycols, trimethylolpropane, 1,5-pentanediol, 2-methyl-1,3-propanediol, 2-ethyl-2-hydroxymethyl-1,3-propanediol, 3-methoxybutanol, 3-methyl-1,5-pentanediol, 1,3-propanediol, 1,4-butanediol, 2,4-heptanediol, and the like; also suitable are amides, ethers, urea, substituted ureas such as thiourea, ethylene urea, alkylurea, alkylthiourea, dialkylurea, and dialkylthiourea, carboxylic acids and their salts, such as 2-methylpentanoic acid, 2-ethyl-3-propylacrylic acid, 2-ethyl-hexanoic acid, 3-ethoxyproponic, acid, and the like, esters, organosulfides, organosulfoxides, sulfones (such as sulfolane), carbitol, butyl carbitol, cellusolve, ethers, tripropylene glycol monomethyl ether, ether derivatives, hydroxyethers, amino alcohols, ketones, N-methylpyrrolidinone, 2-pyrrolidinone, cyclohexylpyrrolidone, amides, sulfoxides, lactones, polyelectrolytes, methyl sulfonylethanol, imidazole, 1,3-dimethyl-2-imidazolidinone, betaine, sugars, such as 1-deoxy-D-galactitol, mannitol, inositol, and the like, substituted and unsubstituted formamides, substituted and unsubstituted acetamides, and other water soluble or water miscible materials, as well as mixtures thereof. In embodiments, the co-solvent is selected from the group consisting of ethylene glycol, N-methylpyrrolidone, methoxylated glycerol, ethoxylated glycerol, and mixtures thereof. When mixtures of water and water soluble or miscible organic liquids are selected as the liquid vehicle, the water to organic ratio ranges can be any suitable or desired ration, in embodiments from about 100:0 to about 30:70, or from about 97:3 to about 40:60, or from about 95:5 to about 60:40. The non-water component of the liquid vehicle generally serves as a humectant or co-solvent which has a boiling point higher than that of water (100° C.). The organic component of the ink vehicle can also serve to modify ink surface tension, modify ink viscosity, dissolve or disperse the colorant, and/or affect the drying characteristics of the ink.

The liquid vehicle can be provided in any suitable or desired amount. In embodiments, the liquid vehicle is present in the stretchable in composition in an amount of from about 70 to about 99.9 percent, or from about 80 to about 99.5 percent, or from about 90 to about 99 percent, by weight, based on the total weight of the stretchable ink composition.

Surfactant.

The inks disclosed may also contain a surfactant. Any surfactant that forms an emulsion of the polyurethane elastomer in the ink can be employed. Examples of suitable surfactants include ionic surfactants, anionic surfactants, cationic surfactants, nonionic surfactants, zwitterionic surfactants, and the like, as well as mixtures thereof. Examples of suitable surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like, with specific examples including primary, secondary, and tertiary amine salt compounds such as hydrochloric acid salts, acetic acid salts of laurylamine, coconut amine, stearylamine, rosin amine; quaternary ammonium salt type compounds such as lauryltrimethylammonium chloride, cetyltrimethylammonium chloride, benzyltributylammonium chloride, benzalkonium chloride, etc.; pyridinium salty type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenyl-hydroxyethylimidazoline, dihydroxyethylstearylamine, stearyldimethylbetaine, and lauryldihydroxyethylbetaine; fluorosurfactants; and the like, as well as mixtures thereof. Additional examples of nonionic surfactants include polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurote, polyoxyethylene stearyl ether, polyoxyethylene nonylphenyl ether, dialkylphenoxy poly(ethyleneoxy) ethanol, available from Rhone-Poulenc as IGEPAL CA-210™ IGEPAL CA-520™, IGEPAL CA-720™, IGEPAL CO-890™, IGEPAL C0-720™, IGEPAL C0-290™, IGEPAL CA-210™, ANTAROX 890™, and ANTAROX 897™. Other examples of suitable nonionic surfactants include a block copolymer of polyethylene oxide and polypropylene oxide, including those commercially available as SYNPERONIC™ PE/F, such as SYNPERONIC™ PE/F 108. Other examples of suitable anionic surfactants include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Sigma-Aldrich, NEOGEN R™, NEOGEN SC™ available from Daiichi Kogyo Seiyaku, combinations thereof, and the like. Other examples of suitable anionic surfactants include DOWFAX™ 2A1, an alkyldiphenyloxide disulfonate from Dow Chemical Company, and/or TAYCA POWER BN2060 from Tayca Corporation (Japan), which are branched sodium dodecyl benzene sulfonates. Other examples of suitable cationic surfactants, which are usually positively charged, include alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C 12, C15, C17 trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, as well as mixtures thereof. Mixtures of any two or more surfactants can be used.

The optional surfactant can be present in any desired or effective amount, in embodiments, the surfactant is present in an amount of from about 0.01 to about 5 percent by weight, based on the total weight of the stretchable ink composition. It should be noted that the surfactants are named as dispersants in some cases.

Crosslinking Agent.

The stretchable ink composition can further comprise crosslinkers. In embodiments, the crosslinker is an organoamine, a dihydroxy aromatic compound, isocyanate, a peroxide, a metal oxide, or the like, as well as mixtures thereof. Crosslinking can further enhance the physical properties of the images generated from the ink composition. The crosslinker can be present in any desired or effective amount, in embodiments from about 0.1 to about 20 percent, or from 5 to about 15 percent, by weight, based on the total weight of the stretchable ink composition.

Additives.

The stretchable ink composition can further comprise additives. Optional additives that can be included in the stretchable ink compositions include biocides, fungicides, pH controlling agents such as acids or bases, phosphate salts, carboxylates salts, sulfite salts, amine salts, buffer solutions, and the like, sequestering agents such as EDTA (ethylenediamine tetra acetic acid), viscosity modifiers, leveling agents, and the like, as well as mixtures thereof.

In embodiments, the stretchable ink composition is a low-viscosity composition. The term "low-viscosity" is used in contrast to conventional high-viscosity inks such as screen printing inks, which tend to have a viscosity of at least 1,000 centipoise (cps). In specific embodiments, the ink disclosed herein has a viscosity of no more than about 100 cps, no more than about 50 cps, or no more than about 20 cps, although the viscosity can be outside of these ranges. When used in ink jet printing applications, the ink compositions are generally of a viscosity suitable for use in said ink jet printing processes. For example, for thermal ink jet printing applications, at room temperature (i.e., about 25° C.), the ink viscosity is at least about 1 centipoise, no more than about 10 centipoise, no more than about 7 centipoise, or no more than about 5 centipoise, although the viscosity can be outside of these ranges. For piezoelectric ink jet printing, at the jetting temperature, the ink viscosity is at least about 2 centipoise, at least about 3 centipoise, no more than about 20 centipoise, no more than about 15 centipoise, or no more than about 10 centipoise, although the viscosity can be outside of these ranges. The jetting temperature can be as low as about 20 to 25° C., and can be as high as about 90° C., as high as about 60° C., or as high as about 40° C., although the jetting temperature can be outside of these ranges.

The stretchable ink compositions can be of any suitable or desired pH. For some embodiments, such as thermal ink jet printing processes, pH values can be at least about 2, at least about 3, at least about 5, up to about 11, up to about 10, or up to about 9, although the pH can be outside of these ranges.

In embodiments, the stretchable ink compositions have a surface tension of at least about 22 dynes per centimeter, at least about 25 dynes per centimeter, at least about 28 dynes per centimeter, no more than about 40 dynes per centimeter, in another embodiment no more than about 38 dynes per centimeter, and or no more than about 35 dynes per centimeter, although the surface tension can be outside of these ranges.

In embodiments, the stretchable ink compositions contain particulates having an average particle diameter of no larger than about 5 micrometers (μm), no larger than about 2 μm, no larger than about 1 μm, or no larger than about 0.5 μm, although the particulate size can be outside of these ranges. In specific embodiments, the polyurethane elastomer is in an emulsion form in the ink, having an average particle diameter of no larger than about 2 μm, no larger than about 1 μm, or no larger than about 0.5 μm, although the particulate size can be outside of these ranges.

The ink compositions can be prepared by any suitable process, such as by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, in embodiments from about 5 to about 10 minutes. Alternatively, the optional ink additives can be mixed with the other ink ingredients during the ink preparation process, which takes place according to any desired procedure, such as by mixing all the ingredients, heating if desired, and filtering.

In a specific embodiment, the inks are prepared as follows: 1) preparation of an emulsion of the polyester optionally stabilized with a surfactant; 2) preparation of an emulsion of the polyurethane elastomer optionally stabilized with a surfactant; 3) preparation of a dispersion of a colorant optionally stabilized with a surfactant; 4) mixing of the polyester emulsion and the polyurethane elastomer emulsion with the colorant dispersion; 5) optional filtering of the mixture; 6) addition of other additives such as co-solvents; and 7) optional filtering of the composition. In specific embodiments, different surfactants are selected provided that they are compatible with one another. In further embodiments, the selected surfactants are the same. The phrase "compatible" means that there is an absence of neutralization (pH or charge) or reaction between them. The best indication of this is that no major or large agglomerates form after mixing the polyurethane elastomer emulsion and the colorant dispersion. This can be characterized by particle size measurement. For example, the particle size of the mixture is substantially the same as that before mixing.

Also disclosed herein is a process which comprises applying an ink composition as disclosed herein to a substrate in an imagewise pattern.

The ink compositions can be used in a process which entails incorporating the ink composition into an ink jet printing apparatus and causing droplets of the ink to be ejected in an imagewise pattern onto a substrate. In a specific embodiment, the printing apparatus employs a thermal ink jet process wherein the ink in the nozzles is selectively heated in an imagewise pattern, thereby causing droplets of the ink to be ejected in imagewise pattern. In another embodiment, the printing apparatus employs an acoustic ink jet process wherein droplets of the ink are caused to be ejected in imagewise pattern by acoustic beams. In yet another embodiment, the printing apparatus employs a piezoelectric ink jet process, wherein droplets of the ink are caused to be ejected in imagewise pattern by oscillations of piezoelectric vibrating elements. Any suitable substrate can be employed.

In a specific embodiment, the process entails printing the ink onto a deformable substrate, such as textile, rubber, rubber sheeting, plastic, plastic sheeting, coated paper, or the like. In some embodiments, the substrate is a stretchable substrate, such as textile or rubber sheets. In other embodiments, the substrate is a plastic which is deformable at an elevated temperature higher than the glass transition temperature of the plastic, for example, in the process of molding into 3-dimensional objects. When the ink disclosed herein is used, the imagewise pattern will not be damaged upon molding. The rubber sheets with the imagewise pattern can be used, for example, as wrap for a 3-D object.

In one embodiment, the inks disclosed herein can be printed on a rubber substrate, such as natural polyisoprene, polybutadiene rubber, chloroprene rubber, neoprene rubber, butyl rubber (copolymer of isobutylene and isoprene), styrene-butadiene rubber, silicon rubber, nitrile rubber (which is a copolymer of butadiene and acrylonitrile), ethylene propylene rubber, ethylene propylene diene rubber, epichlorohydrin rubber, polyacrylic rubber, ethylene-vinyl acetate, polyether block amides, polysulfide rubber, chlorosulfonated polyethylene as Hypalon, or the like. In a specific embodiment, the inks disclosed herein can be printed on a deformable substrate, in embodiments, silicon rubber, polyacrylic rubber, butyl rubber, or neoprene rubber substrate and the imaged substrate can be stretched in one axial direction (i.e., along the x-axis, as opposed to both the x-axis and the y-axis) to, in embodiments, at least 110%, at least 150%, at least 200%, or at least 500% of the length of its original dimension, in embodiments, at least about 50 times, at least about 100 times, or at least about 500 times, without exhibiting visible cracks or delamination. In embodiments, the stretchable ink has the characteristic that an image printed with the stretchable ink composition can be stretched in one axial direction to up to at least 110% along the length of its original dimension without exhibiting any visible cracks or delamination to the naked human eye; or has the characteristic that an image printed with the stretchable ink composition can be stretched in one axial direction to from about 110% to about 500% along the length of its original dimension without exhibiting any visible cracks or delamination to the naked human eye.

In embodiments, images generated with the stretchable inks herein are highly water-resistant. In one embodiment, images generated with the inks exhibit a water droplet contact angle of at least about 80°, at least about 90°, or at least about 95°, although the contact angle can be outside of these ranges. The water-resistant characteristic renders the ink disclosed herein suitable for outdoor applications or printing on water-related products such vehicle wrap, swimming suits, and the like.

In a specific embodiment, the images generated with the stretchable inks disclosed herein have a good chemical resistance. For example, they can exhibit good to excellent resistance toward alcohols, acetic acid, acetamide, allyl bromide, allyl chloride, benzoyl chloride, ethers, esters, hydrocarbons, blood, salt solutions, and the like.

In embodiments, images generated with the stretchable inks disclosed herein have a tensile strength of at least about 1.0 MPa, at least about 3 MPa, at least about 4 MPa, at least about 8 MPa, no more than about 25 MPa, no more than about 20 MPa, or no more than about 18 MPa, as measured by ASTM D412C, although the tensile strength can be outside of these ranges.

In embodiments, images generated with the stretchable inks disclosed herein have an elongation at break of at least about 150%, at least about 200%, at least about 400%, no more than about 1000%, no more than about 800%, or no more than about 700%, as measured by ASTM 0412C, although the elongation at break can be outside of these ranges. Generally, the images have a larger elongation at break than that of the deformable substrate.

In embodiments, images generated with the stretchable inks disclosed herein have a hardness (Shore A) value of at least about 20, at least about 30, at least about 40, no more than about 100, no more than about 90, or no more than about 85, as measured by ASTM 2240, although the hardness can be outside of these ranges.

In embodiments, images generated with the stretchable inks disclosed herein form a continuous layer on the substrate. Therefore, the images will have a small color difference with or without stretching. This is in contrast to some conventional stretchable images that are composed of a dots array. Images based on a discontinuous dots array have poor image quality, especially upon stretching, for example, the color density will decrease dramatically. In embodiments, the images generated with the stretchable ink composition herein has a color difference ($\Delta E$) less than 5.0, or less than 3.5, or less than 2.0, or less than 1.0, when stretched in one axial direction to about 150%. It is generally known that human eyes cannot differentiate the colors with color difference ($\Delta E$ 2000) values of <3.0. Color difference ($\Delta E$ 2000) values of >6.0 are considered a very obvious color difference.

In embodiments, images generated with the stretchable inks disclosed herein have an excellent adhesion on various substrates prior to or after stretching.

In embodiments, a patterned article herein comprises a deformable substrate; an image printed on the deformable substrate, the image being formed from a stretchable ink comprising a polyester; a polyurethane elastomer; water; a co-solvent; an optional surfactant; and an optional colorant. In a specific embodiment, the printed image can be stretched along one axis to at least 110% of the length of its original dimension without exhibiting visible cracks or delamination from the deformable substrate. In another embodiment, the image printed with the stretchable ink composition has a color difference less than 3.0 when stretched in one axial direction to about 150% relative to a non-stretched printed image.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

Latex inks having two resin components were formulated and printed on three different substrates: normal paper, coated paper, and rubber substrate. The resultant images were characterized for their image robustness. Polyester of the formula

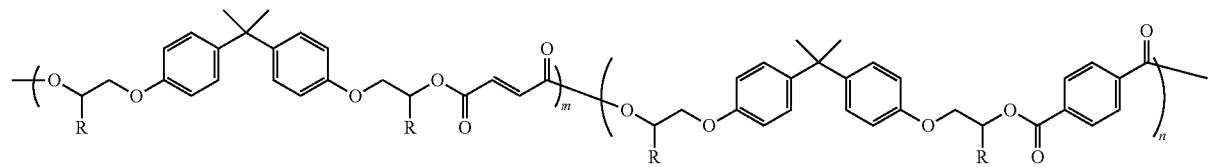

wherein R is hydrogen or a methyl group, m is from about 2 to about 10, and n is from about 2 to about 10, having a glass transition temperature of about 60° C. was used as the first resin.

A urethane elastomer emulsion, Precidium™ Aqua 90-A, an aliphatic polyester based polyurethane from Quantum technical services (solid content 32 weight %), was used as the second resin, which has an average particle size of about 85 nanometers.

The polyester resin was first emulsified using 4-dodecyl-benzenesulfonic acid (SDBS) surfactant, yield emulsion with an average particle size about 50 nanometers. The emulsion was then mixed with the above polyurethane emulsion, pigment dispersion (Green 7, solid contents 19.96%, surfactants SDBS), and co-solvents to minimize drying of the ink in the print nozzle.

The following table shows the ink formulations for Example Ink 1 (a stretchable ink in accordance with the present disclosure) and a Comparative Ink. As a comparison, an ink without the elastomer component was also prepared.

TABLE 1

| | Comparative Ink | Example Ink 1 |
|---|---|---|
| Polyurethane Emulsion | — | 12.5% |
| Polyester Emulsion | 30% | 12.5% |
| Ethylene Glycol | 25% | 25% |
| Ethoxylated Glycerol | 6% | 6% |
| Pigment Dispersion | 5% | 5% |
| Water | 34% | 39% |

The components were mixed very well for both the Comparative Ink and the Example Ink 1. Particle analysis showed no aggregation of the emulsions upon mixing. The average particle sizes remained to be around 82 nanometers. Both inks had a viscosity of about 3.5 cps.

Inks according to the formulas above were used to print images using a DMP-2800 (FujiFilm Dimatix, Santa Clara, Calif.) inkjet printer equipped with 10 pL cartridges on normal paper, gloss paper (photo paper) and plasma cleaned latex rubber to characterize their adhesion and print quality. Print conditions such as waveform, voltage, and substrate temperature were all optimized for the best printing properties and kept constant for each ink.

Comparative Ink.

When printed on normal paper, the image printed with the Comparative Ink had good resolution and color density. Without any heat treatment the image passed the tape test and could not be removed by rubbing with an eraser. When printed on gloss paper and latex rubber, the image again had good resolution and color density. However, without heat treatment the image failed the tape test and was easily rubbed off. A second sample was printed and thermally treated at 70° C. on a hot plate to dry the sample and to coalesce the latex particles. Even after heat treatment the image still failed both the tape test and rub test.

Example Ink 1.

When printed on normal paper, the image printed with the Example Ink 1 of the present disclosure had good resolution and color density. Without heat treatment the image passed the rub test and tape test. When printed on gloss paper and latex rubber, the image again had good resolution and color density. Without heating the image failed the rub and tape test. After heating at 70° C. on a hot plate, the image passed both the rub test and tape test.

Table 2 provides a summary of the adhesion based on rub and tape tests.

3M™ Scotch® tape was used for tape test. The tape was placed on top of the image with a 20 gram weight load, then the tape was removed gently. The percentage of an image that was removed by the tape was examined 0% indicates an excellent adhesion, less than 5% is considered as good adhesion, while larger than 20% is defined as poor adhesion. A cotton swab was used for the rub test. The image was rubbed 30 times with the cotton swab and then examined under a microscope. No or little surface damage was considered as good adhesion.

TABLE 2

|  | Polyester Resin (I) | Polyester Resin (I) + Precidium Aqua 90-A |
| --- | --- | --- |
| Normal paper | Good | Good |
| Gloss paper | Poor | Good |
| Latex rubber | Poor | Good |

The image formed on the rubber substrate with the ink of the present disclosure was subjected to hundreds stretching-relaxation cycle to about 150% elongation. No cracks and de-lamination was observed after stretching.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A patterned article comprising:
   a deformable substrate;
   an image printed on the deformable substrate, the image being formed from a stretchable ink comprising:
   a polyester emulsion or latex, wherein the glass transition temperature of the polyester is from 30° C. to about 180° C.;
   a polyurethane elastomer emulsion or latex, wherein the glass transition temperature of the polyurethane elastomer is from about −70° C. to about 10° C.;
   water;
   a co-solvent;
   an optional surfactant; and
   an optional colorant.

2. The patterned article of claim 1, wherein the deformable substrate is selected from the group consisting of plastic, rubber, textile, coated paper, and mixtures thereof.

3. The patterned article of claim 1, wherein the printed image can be stretched along one axis to at least 110% of the length of its original dimension without exhibiting visible cracks or delamination from the deformable substrate.

4. The patterned article of claim 1, wherein an image printed with the stretchable ink composition has a color difference of less than 3.0 when stretched in one axial direction to about 150% relative to the non-stretched printed image.

5. The patterned article of claim 1, wherein the polyester is a compound of the formula

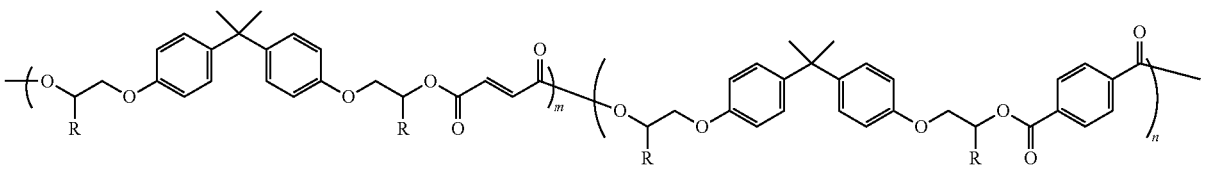

wherein R is hydrogen or methyl, m is an integer of from about 2 to about 10, and n is an integer of from about 2 to about 10.

6. The patterned article of claim 1, wherein the polyurethane emulsion or latex has a volume average particle size of from about 20 to about 800 nanometers; and wherein the polyester emulsion or latex has a volume average particle size of from about 20 nanometers to about 800 nanometers.

7. The patterned article of claim 1, wherein the polyurethane elastomer is a product of a polyol and an isocyanate with diol or diamine as a chain extender;
   wherein the polyol is a compound of the formula

HO-M-OH wherein M is selected from the group consisting of polyester, polyether, polycaprolactones, polybutadiene, and mixtures thereof; and
   wherein the isocyanate is a compound of the formula $OCN-R_1-NCO$ wherein $R_1$ is selected from the group consisting of an aromatic group, an aliphatic group, and mixtures thereof, and wherein $R_1$ has from about 4 to about 24 carbon atoms.

8. The patterned article of claim 1, wherein the polyurethane elastomer is a polyurethane elastomer with a urethane linkage of the formula $OCN-R_2-NCO$ wherein $R_2$ is selected from the group consisting of an aromatic group, an aliphatic group, and mixtures thereof, and wherein $R_2$ has from about 4 to about 24 carbon atoms.

9. The patterned article of claim 1, wherein the polyurethane elastomer is a polyurethane elastomer with a urea linkage of the formula $H_2N-R_3-NH_2$ wherein $R_3$ is selected from the group consisting of an aromatic group, an aliphatic group, and mixtures thereof, and wherein $R_2$ has from about 4 to about 24 carbon atoms.

10. The patterned article of claim 1, wherein the co-solvent is an alcohol or alcohol derivative selected from the group consisting of aliphatic alcohols, aromatic alcohols, diols, glycol ethers, polyglycol ethers, primary aliphatic alcohols, secondary aliphatic alcohols, 1,2-alcohols, 1,3-alcohols, 1,5-alcohols, ethylene glycol alkyl ethers, propylene glycol alkyl ethers, methoxylated glycerol, and ethoxylated glycerol.

11. The patterned article of claim 1, wherein the co-solvent is selected from the group consisting of ethylene glycol, N-methylpyrrolidone, methoxylated glycerol, ethoxylated glycerol, and mixtures thereof.

12. The patterned article of claim 1, wherein the surfactant is selected from the group consisting of ionic surfactants, nonionic surfactants, zwitterionic surfactants, and mixtures thereof.

13. The patterned article of claim 1, wherein the colorant is selected from the group consisting of dyes, pigments, and combinations thereof; and optionally, wherein the colorant is a dispersion comprising a colorant, an optional surfactant, and an optional dispersant.

14. The patterned article of claim 1, wherein the polyurethane elastomer has a tensile strength of at least 1.0 MPa to no more than 18 MPa.

15. The patterned article of claim 1, wherein the stretchable ink is a radiation curable ink.

\* \* \* \* \*